Oct. 7, 1930.  C. A. JACKSON  1,777,850
POWER GENERATING SYSTEM
Filed Sept. 16, 1926   3 Sheets-Sheet 1
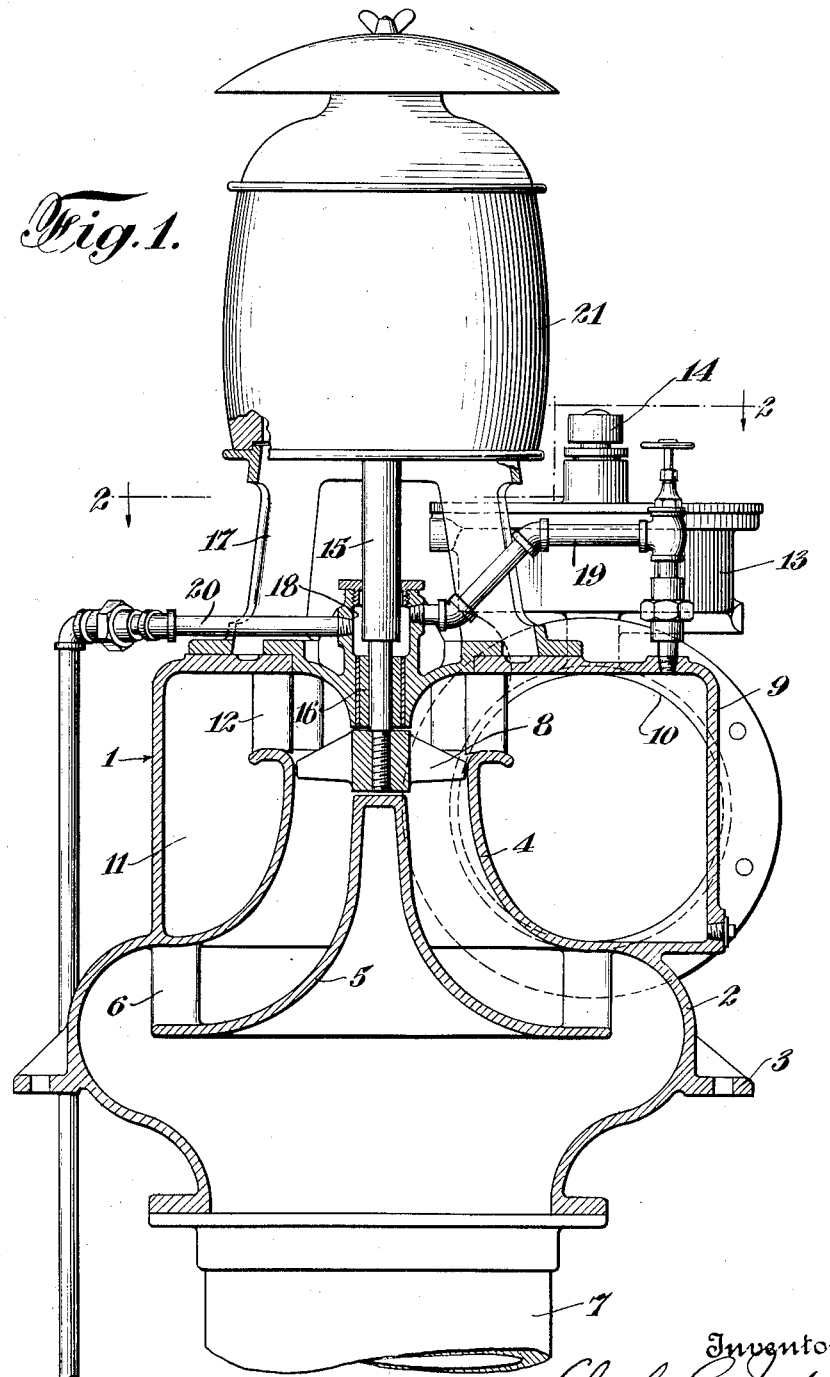

Oct. 7, 1930.  C. A. JACKSON  1,777,850
POWER GENERATING SYSTEM
Filed Sept. 16, 1926   3 Sheets-Sheet 2
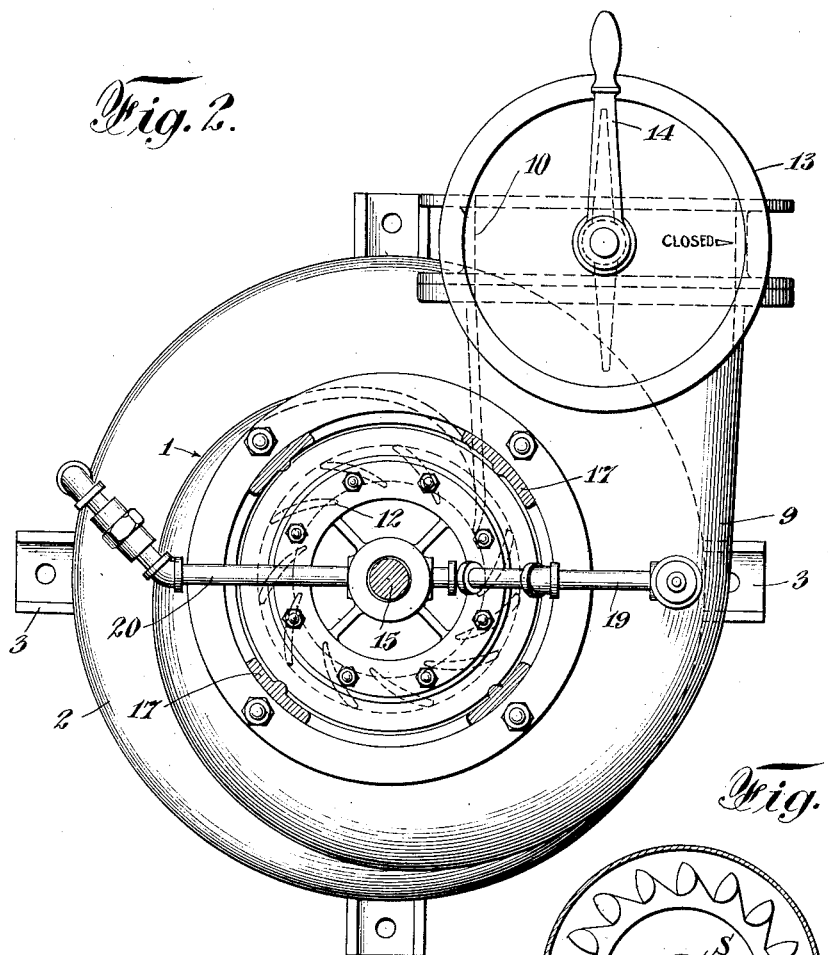
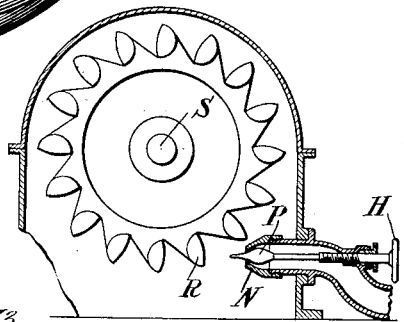
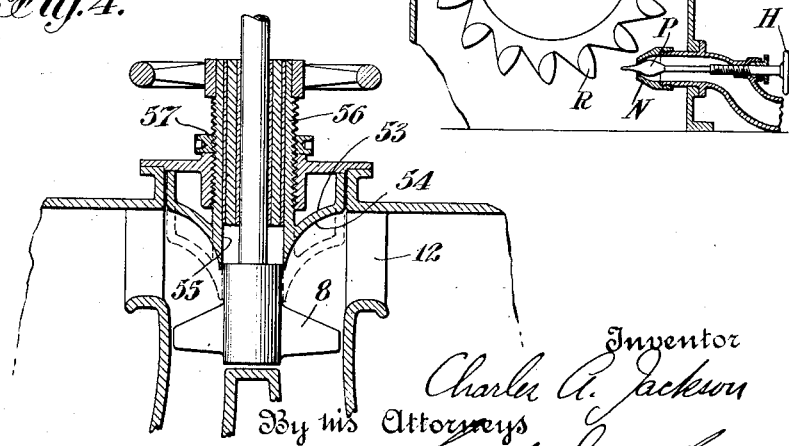
Inventor
Charles A. Jackson
By his Attorneys
Edwards, Sager & Bower Oct. 7, 1930.  C. A. JACKSON  1,777,850
POWER GENERATING SYSTEM
Filed Sept. 16, 1926  3 Sheets-Sheet 3
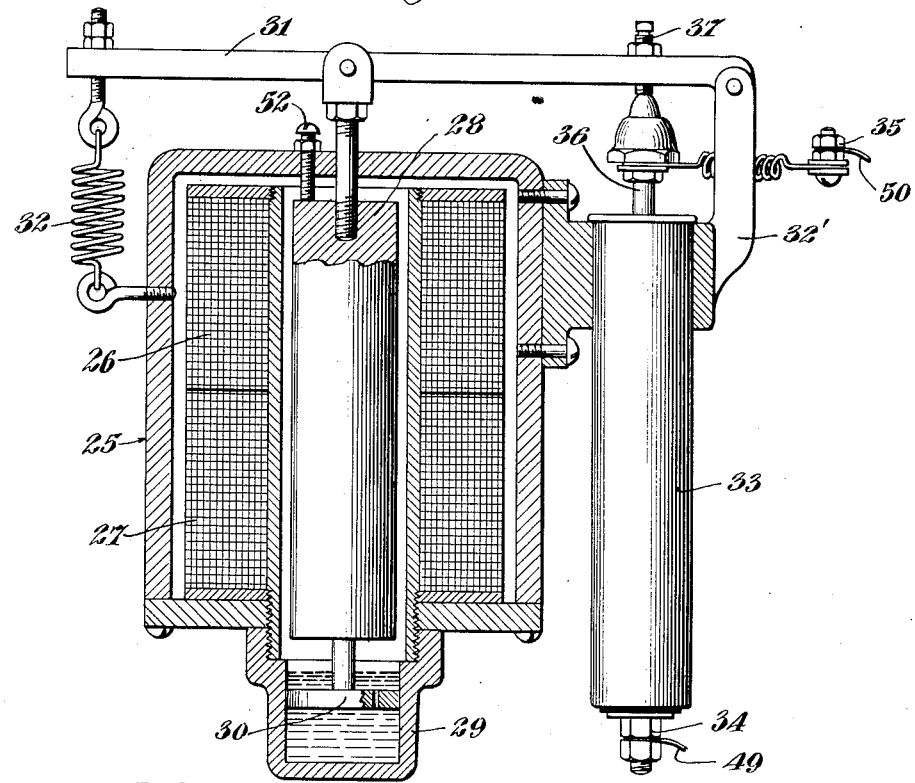
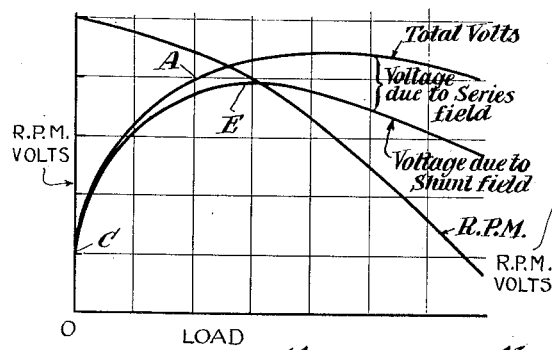
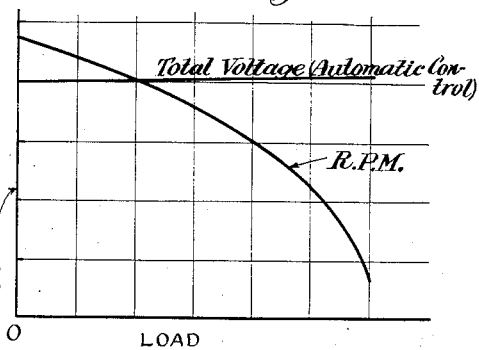

Patented Oct. 7, 1930

1,777,850

UNITED STATES PATENT OFFICE

CHARLES A. JACKSON, OF RIDGEWOOD, NEW JERSEY

POWER-GENERATING SYSTEM

Application filed September 16, 1926. Serial No. 135,756.

This invention relates to the generation of electricity and particularly to its generation from water power in small installations such as those adapted for use in connection with farm lighting and power systems and the like.

The object of the invention is to provide a generating system which will be simple and inexpensive and rugged in service.

A further object of the invention is to provide a system which will develop a substantially constant voltage under varying load and without any special control of the supply of power to the turbine which herein is specifically a hydraulic turbine, so as to dispense with the usual automatic gate or valve control of the flow to the turbine.

Other objects and advantages will be apparent from the following description of the accompanying drawings, in which Fig. 1 is a partial vertical sectional view of the assembled unit;

Fig. 2 is a sectional view on line 2—2 of Fig. 1;

Fig. 3 is an automatic solenoid controlled resistance for the generator field;

Fig. 4 is a sectional view of a modified form of gate control for the hydraulic turbine;

Fig. 5 is a wiring diagram for the generator field and the resistance control therefor;

Fig. 6 is a graph showing the relation between the voltage and speed without automatic control;

Fig. 7 is a graph showing the relation between the speed and voltage under automatic field control, and Fig. 8 is a partial vertical sectional view of a modification.

In hydraulically operated electrical generating systems or units for small isolated installations, such as farm lighting systems, it is highly desirable to provide a very simple and compact generating unit which will require very little attention and will be automatic in its regulation, such as maintaining substantially constant voltage irrespective of load changes.

In the prior art devices constant voltage is obtained during varying load changes by maintaining substantially constant speed of the turbine generator unit, there being a governing mechanism employed with the hydraulic turbine. This type of governor control varies the fluid flow to the turbine in accordance with load conditions by varying the area of the passages leading thereto. Such automatic governing equipment, due to its inherently large size, constitutes a very large portion of the unit which is comparatively small. Moreover, the governing equipment constitutes a large initial expense of the unit, but what is also important, is the fact that any governing system for a hydraulic turbine requires attention in service and will in time require extensive repairs.

To attain the utmost simplicity, economy in construction and a minimum of repairs I have done away with any governing mechanism for the hydraulic turbine and allow the turbine under its varying load conditions to operate at the speed corresponding to the torque resistance of the load, instead of controlling the turbine speed as in the prior art.

The characteristics particularly of a hydraulic turbine operating without a speed governor are, I have found, of such a nature that they may be automatically compensated for within certain limits by certain electrical characteristics of the generator field such as described herein, thereby obtaining substantially constant voltage within said limits irrespective of load changes or wide speed variations. The operating characteristic of the ungoverned hydraulic turbine is represented by its speed-load curve which is a relatively straight line from no load to full load thus rendering an ungoverned hydraulic turbine peculiarly inherently adapted for cooperation with a suitably compounded generator. With such a speed-load curve a uniformly increasing load is accompanied by a corresponding substantially uniformly decreasing speed or vice versa. In my improved combination I take advantage of this peculiar relation between the speed and load for it permits a properly designed compound generator to produce a substantially constant voltage through a wide range of speed and load.

The turbine 1 is herein shown as of the reaction type, although it will be understood that an impulse turbine or any other type of hydraulic turbine might be used. In order to make the unit as compact as possible there is provided a combined base and discharge casing 2 having supporting flanges 3 projecting therefrom. Extending upwardly from the casing 2 is a draft tube 4 spaced from which is a cone 5, the latter being supported by suitable ribs 6 depending from the upper side of the casing 2. A tail pipe 7 of any suitable length may be connected to the discharge casing while inlet passages to the turbine runner 8 which is of the propeller type are formed by walls 9 carried on the upper side of casing 2. Water will enter through a suitable inlet 10 and pass around the spiral passage 11, then flow through suitable guide vanes 12, which may be straight if desired but which preferably are angularly disposed to impart whirl to the entering water, then flow into the transition space immediately above the runner and thence through the runner and draft tube to the tail pipe 7. Fluid flow through the inlet 10 may be controlled by any suitable and usual type of gate valve but is herein controlled by a pivot valve oscillated by a suitable hydraulic motor 13 which if desired may be provided with a suitable handle 14. The motor and valve is mounted upon the casing 9 thereby forming a part of the self-contained and compact unit. As the type of motor or gate control does not per se form a part of my invention it has not been shown in detail. The same is identical, however, to the combined valve and motor shown in my copending application filed October 19, 1925, Serial No. 63,216, for valve.

The turbine runner shaft 15 extends through a suitable bearing 16 carried by a lower portion of the generator base 17 and there is provided immediately above the bearing 16 a leakage chamber 18 from which pipes 19 and 20 lead respectively to the spiral passage 11 and to a suitable drain. The generator 21 is supported upon the base 17 and specifically is of the direct current compound type having the usual shunt and series field.

As it is the object of this invention to do away with any governing equipment for the turbine and to allow the turbine to run uncontrolled at any speed it might obtain but at the same time to maintain within certain limits a relatively constant voltage, the series and shunt windings may be so proportioned that at low speeds, caused by a large current load, the series field will produce substantially normal voltage, while at high speeds or at substantially no load the shunt field will produce substantially normal voltage. The voltage, of course, produced by each field will vary automatically in accordance with the speed. The voltage produced by each field for any particular turbine speed or R. P. M. is shown in Fig. 6, it being noted that between the points A and B voltage regulation is within a relatively narrow range compared to the voltage between the points A and C. In order to obtain the specific curves of Figs. 6 and 7 the field proportions are approximately 75% series and 25% shunt. It is also to be noted that the voltage due to the shunt field, drops materially as the turbine speed decreases, whereas the total voltage drops at a materially less rate, thereby showing the effect of the series field. On the other hand, the voltage due to the shunt field increases materially within the area adjacent the point E, while the total voltage has not materially changed, thereby showing at higher turbine speeds the effect of the shunt field. Hence, it will be seen that without any turbine governor equipment and allowing the same to run at any speed and without any supplementary control over the generator field, a fair degree of voltage regulation is obtained within certain turbine speed limits such as would be encountered in practice. If the voltage regulation, provided by such an arrangement, is sufficient for any particular installation the unit could be used as described.

However, should it be desired to obtain a very close voltage regulation and without the use of turbine governor equipment there may be provided an automatic field control adapted to vary current flow through the series field in accordance with the generator load. One specific form of field control as shown in Fig. 3 comprises a solenoid 25 having current and voltage coils 26 and 27 respectively within which is disposed a suitable solenoid core 28. An oil dashpot 29 has a ported piston 30 connected to the lower end of the core while the upper end thereof is connected to a lever 31 normally pulled downwardly by an adjustable tension spring 32'. The other end of lever 31 is pivotally supported upon a bracket 32', which carries any suitable variable resistance, herein disclosed preferably as a carbon pack 33, the terminals of which are 34 and 35, while variable resistance is obtained by varying pressure upon a plunger 36 through an adjustable set screw 37 carried by the lever 31.

In Fig. 5 this supplementary field control is diagrammatically shown in the wiring diagram. As shown the generator 21 has a usual shunt field 40 adapted if desired to be controlled by a manually operated rheostat 41, while a series field 42 is disposed as usual in one of the main lines 43. The other main line 44 passes into the current coil 26 of the solenoid 25 and out through a wire 45 to a continuation 44 of the main line. The voltage coil 27 is connected across lines 43 and 44 by wires 47 and 48, while the field resistance carbon pack 33 is connected across the terminals of the series field 42 by wires 49 and 50. Assuming that the desired shunt field regulation is obtained for any given seasonal load, when the turbine speed increases or drops the current and voltage coils 26 and 27 will operate through solenoid core 28, lever 31 and plunger 36 to vary the resistance 33 and variably control the current flow through the series field 42, thereby to maintain a voltage regulation which is very close and fully comparable to that voltage regulation obtained by the speed governed turbine units. The degree of voltage regulation obtained by my improved combination is shown in Fig. 7, wherein for wide turbine speed variations the voltage is a substantially straight line. While the line is shown as slightly increasing as the load increases, which is desirable, it may by properly proportioning either the resistance 41 or the shunt and series field coils be made to take any desired inclination. The dashpot 29 insures even operation of the resistance 33, thereby preventing any sudden changes of the series field. The degree of greatest resistance of the carbon pack 33 may be adjusted by a set screw 52.

The flow to the turbine runner being uncontrolled will not vary at a given constant speed of the runner; at higher speeds of the runner there will be in a reaction turbine a slight increase in the volume of the flow so that the volume of fluid flow is not constant from no load to full load. For instance, the increase in flow may be in the neighborhood of 25% from full load to no load conditions when operating under a head of twenty feet. As shown in Fig. 8, where a generator not shown is mounted on a horizontal shaft driven by the runner of the impulse type, the jet from the nozzle may be set at any desired power by the adjustable needle P controlled by the hand wheel H. With this impulse turbine the flow will not vary with the speed of the runner, but will be entirely independent thereof.

In Fig. 4 is shown a modification wherein fluid flow to the turbine may be controlled by a gate 53 having a conical surface 54 conforming to the flow lines of fluid for the turbine runner 8, said gate having a bore 55 slidably engaging the hub of runner 8. Suitable means may be provided for adjusting the gate 53, such for instance, as a hand wheel operated screw 56 having a nut lock 57 thereon. The gate 53 will be used whenever a load less than normal will be carried for any extended length of time, the gate during such time assuming a fixed intermediate position.

The elimination of the turbine governor equipment permits, as seen in Fig. 1, a very compact unit in that space does not have to be provided for the usual mechanical connections leading to the flow controlling devices generally employed, such for instance, as wicket or plunger gates or in some instances adjustable turbine blades. With any of these types of controlling mechanisms the operating means would make the complete structure considerably larger than that shown in Fig. 1 and certainly far more costly.

While I have specifically shown and described my invention in connection with a hydraulic turbine it will of course be understood that within the scope of the appended claims other types of prime movers may be used having generally similar operating characteristics adapted for cooperation with the generator herein disclosed.

I claim:

1. In a power generating system the combination with a hydraulic turbine having a runner with fixed blades and intake passage invariable during load variations whereby the speed-load operating characteristic of the turbine permits a material speed variation in accordance with load changes and an electrical generator, driven by said turbine, having means to control the voltage within predetermined limits between substantially no load and full load whereby the respective operating characteristics of the turbine and generator are coordinated to effect a governorless automatic voltage controlled generating unit.

2. In a power generating system, a hydraulic turbine having a runner with fixed blades and passages for conducting flow thereto, said passages during load variations on said turbine remaining of fixed cross sectional area whereby the turbine speed will vary with the load, and an electrical generator, driven by said turbine having means adapted to compensate automatically for turbine speed changes so as to maintain a relatively narrow voltage regulation for a relatively wide speed variation of said runner.

3. In a power generating system, a hydraulic turbine having a runner with fixed blades and a passage for conducting flow thereto, said passage during load variations on said turbine remaining of fixed cross-sectional area whereby the turbine speed varies with the load, and an electrical generator, driven by said turbine, having a field arrangement adapted to compensate automatically for the speed variations of the turbine thereby to maintain a voltage regulation within a relatively narrow range.

4. In a power generating system, a hydraulic turbine having a runner provided with fixed blades and a passage for conducting flow to the runner, said passage being invariable during load changes on the turbine and adapted between no load and full load to have a decreasing volume of fluid flow therethrough whereby the turbine speed variation will be relatively wide, and an electrical generator driven by said turbine and having means controlling the voltage so as to maintain the voltage within predetermined limits between no load and full load.

5. In a power generating system, a hydraulic turbine having a runner provided with fixed blades and a passage for conducting flow to the runner, said passage being invariable during load changes on the turbine and adapted between no load and full load to have a decreasing volume of fluid flow therethrough whereby the turbine speed variation will be relatively wide, and an electrical generator driven by said turbine and having a compound field including series and shunt windings proportioned so that at low speeds and large loads said series winding is effective to produce a substantially normal voltage while at high speeds and low loads said shunt winding is effective.

6. In a power generating system, a hydraulic turbine having its flow conduit of constant cross-section throughout operation whereby said turbine will have a high speed at no load and a low speed at full load, an electrical generator driven thereby, and means for controlling the generated voltage automatically in accordance with the turbine load whereby at substantially no load the generated voltage does not exceed the voltage at full load.

7. In a power generating system, a hydraulic turbine having its flow conduit of constant cross-section throughout operation whereby the turbine speed varies in accordance with the load thereon, an electrical generator driven thereby having a field, and electrical means for controlling said field automatically in accordance with load changes whereby at substantially no load the generated voltage does not exceed the voltage at full load.

8. In a power generating system, a hydraulic turbine having its flow conduit of constant cross-section throughout operation whereby the turbine speed varies in accordance with the load thereon, an electrical generator driven thereby having a field, and electrical means for controlling said field automatically in accordance with load changes thereby to maintain a substantially constant voltage regulation, said electrical means including a field resistance and a solenoid for variably controlling said resistance.

9. In a power generating system, a hydraulic turbine having its flow conduit of constant cross-section throughout operation whereby the turbine speed varies in accordance with the load thereon, an electrical generator driven thereby having a field, and electrical means for controlling said field automatically in accordance with load changes thereby to maintain a substantially constant voltage regulation, said electrical means including a field resistance and a solenoid for variably controlling said resistance, and means whereby said solenoid is actuated in accordance with both the voltage and current of said generator.

10. In a power generating system, a hydraulic turbine having its flow conduit of constant cross-section during variable load changes thereon whereby turbine speed varies for different loads, and an electrical generator driven thereby and having electrical means for controlling the generated voltage thereby to maintain a substantially constant voltage regulation during variable speed and load conditions on said turbine, said electrical means having a solenoid actuated resistance and a dashpot associated therewith.

11. In a power generating system, a hydraulic turbine having its flow conduit of constant cross-section throughout operation whereby the turbine speed will vary in accordance with the load thereon, a direct current electrical generator driven thereby having shunt and series windings adapted to effect automatically within certain speed limits a certain voltage regulation, and supplementary means rendered automatically operative in accordance with the generator load to effect further voltage regulation thereby to maintain a substantially constant voltage during wide turbine speed variations 12. In a power generating system, a hydraulic turbine having its flow conduit of constant cross-section throughout operation whereby the turbine speed will vary in accordance with the load thereon, a direct current electrical generator driven thereby having shunt and series windings adapted to effect automatically within certain speed limits a certain voltage regulation, and supplementary means rendered automatically operative in accordance with the generator load to effect further voltage regulation thereby to maintain a substantially constant voltage during wide turbine speed variations, said supplementary means including a resistance for controlling current flow through said series field.

13. In a power generating system, a hydraulic turbine having its flow conduit of constant cross-section throughout operation whereby the turbine speed will vary in accordance with the load thereon, a direct current electrical generator driven thereby having shunt and series fields, and supplementary means placed in parallel with said series field and rendered automatically operative in accordance with variations in the generator voltage.

14. In a power generating system, a hydraulic turbine having its flow conduit of constant cross-section throughout operation whereby the turbine speed will vary in accordance with the load thereon, a direct current electrical generator driven thereby having shunt and series fields, and supplementary means rendered automatically operative in accordance with the generator voltage to effect voltage regulation, said supplementary means including a variable resistance for controlling current flow through said series field and means for controlling said resistance.

15. In a power generating system, a direct current electrical generator having shunt and series fields, and supplementary means rendered automatically operative in accordance with the generator voltage to effect voltage regulation, said supplementary means including a variable resistance for controlling a bypass of current around said series field, and a solenoid for effecting control of said variable resistance.

16. In a power generating system, a fluid operated prime mover having its fluid supply passage of constant cross section throughout operation and said prime mover being of the type whereby its speed-load operating characteristic permits a material speed variation in accordance with load changes, said prime mover having a definite maximum speed at no load, and a direct current electrical generator, driven by said prime mover, having means to control the voltage within predetermined limits between substantially no-load and full load automatically upon variations in the load and speed, whereby the respective operating characteristics of the prime mover and generator are coordinated to effect a governorless automatic voltage controlled generating unit.

CHARLES A. JACKSON.